United States Patent [19]
Jalbert

[11] Patent Number: 5,174,529
[45] Date of Patent: Dec. 29, 1992

[54] RAM AIR MULTI-CELL WING TYPE CANOPY

[76] Inventor: Domina C. Jalbert, 7652 W. Lake Dr., West Palm Beach, Fla. 33406

[21] Appl. No.: 799,108

[22] Filed: Nov. 27, 1991

[51] Int. Cl.$^5$ .............................................. B64D 17/02
[52] U.S. Cl. .................................... 244/145; 244/142; 244/902
[58] Field of Search ............ 244/142, 145, 902, 153 R

[56] References Cited

U.S. PATENT DOCUMENTS

| | | | |
|---|---|---|---|
| 3,285,546 | 11/1966 | Jalbert | 244/145 |
| 4,191,349 | 3/1980 | Pravaz | 244/902 X |
| 4,634,080 | 1/1987 | McNally | 244/902 X |
| 4,771,970 | 9/1988 | Sutton | 244/145 |
| 4,811,920 | 3/1989 | Aswith et al. | 244/902 X |
| 4,930,728 | 6/1990 | Wittington | 244/145 |

FOREIGN PATENT DOCUMENTS 1143383  2/1969  United Kingdom ................ 244/145

Primary Examiner—Joseph F. Peters, Jr.
Assistant Examiner—Christopher P. Ellis
Attorney, Agent, or Firm—Jack N. McCarthy

[57] ABSTRACT

An improved ram air, multi-cell wing type canopy with suspension flares has its lower surface shortened to provide an enlarged inlet; one flare is directly attached to its upper surface. A modification has a channel provided to direct air flow over the upper surface. Scoops under the lower surface at the rear end provide protection against the canopy uncontrollably folding under.

19 Claims, 11 Drawing Sheets

5,174,529

RAM AIR MULTI-CELL WING TYPE CANOPY

TECHNICAL FIELD

This invention relates to parachutes and kites, especially of the type having a ram air, multi-cell, wing type canopy.

BACKGROUND ART

Parachutes of the ram air, multi-cell, wing type canopy have had changes made therein since the invention of this type of parachute by Domina C. Jalbert and patented by him in U.S. Pat. No. 3,285,546. The present invention is an improvement to increase the performance of this type of parachute.

Patents setting forth the background for this invention are U.S. Pats. Nos. Re. 26,427; 3,285,546; 4,191,349; 4,637,576; and 4,930,726.

DISCLOSURE OF INVENTION

An object of this invention is to provide a ram air, multi-cell, wing type parachute having an improved performance, including lift characteristics.

Another object of the present invention is to provide a ram air canopy with the top flexible sheet having a downwardly extending forward nose section with the forward edge of the bottom flexible sheet moved rearwardly of the forward edge of the top flexible sheet to have approximately 20% to 30% of the chord of the ram air canopy open so that entering air can act directly on the underside of the top flexible sheet to provide a dynamic lift force having a forward component.

It is another object of this invention to provide flares of the back row of a ram air, multi-cell, wing type canopy with a sheet sewn between their rearward edges to form a scoop with the bottom flexible sheet which acts as a brake to prevent the trailing edge of the canopy from folding up, especially in tethered flight.

Another object of the present invention is to provide a ram air canopy with a separate upper channel section fixed on the top flexible sheet of the basic ram air, multi-cell, wing type canopy.

A further object of this invention is to provide a downwardly extending nose section from the top of the fixed separate upper channel section to a point forwardly of the forward edge of the top flexible sheet of the basic canopy.

Another object of the present invention is to provide inlet guides from said downwardly extending nose section aligned with multi-cell dividers in the separate upper channel section and basic ram air, multi-cell, wing type canopy, said inlet guides extending downwardly in line with a forward keel member or triangular support section.

A further object of the invention is to move the forward edge of the top flexible sheet of the basic ram air, multi-cell, wing type canopy rearwardly and to also move the forward edge of the bottom flexible sheet of the basic ram air, multi-cell, wing type canopy rearwardly of the forward edge of the top flexible sheet.

Another object of this invention is to provide a canopy with a maximum forward glide ratio with a low rate of descent.

Another object of this invention is to provide an extending nose section which furnishes a large portion of the forward lift, the balance of the chord provides the balance with dynamic lift.

Figure 1:
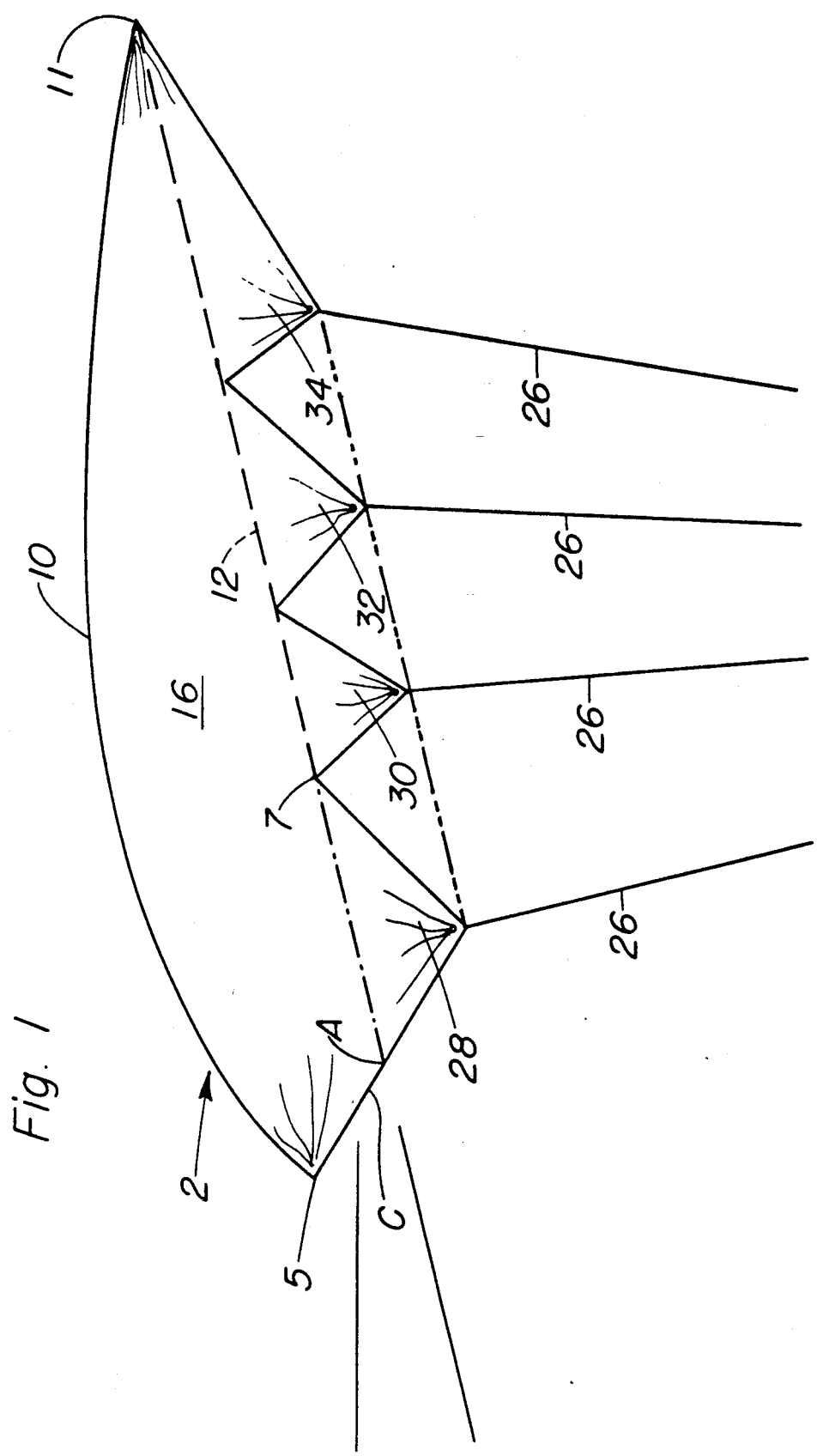
FIG. 1 is a side view of the left side of a modification of an improved ram air, multi-cell, wing type canopy with the forward edge of the bottom flexible sheet moved rearwardly approximately 20% to 30%.
Figure 2:
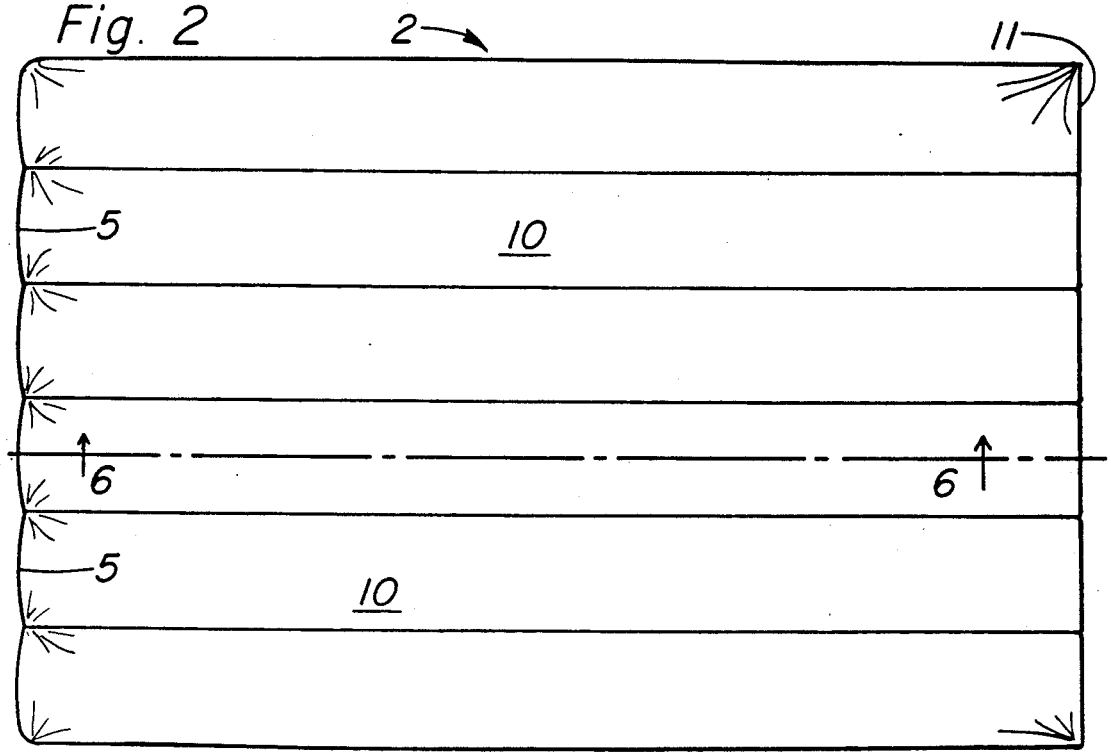
FIG. 2 is a top view of the modification of the improved ram air, multi-cell, wing type canopy of FIG. 1.
Figure 3:
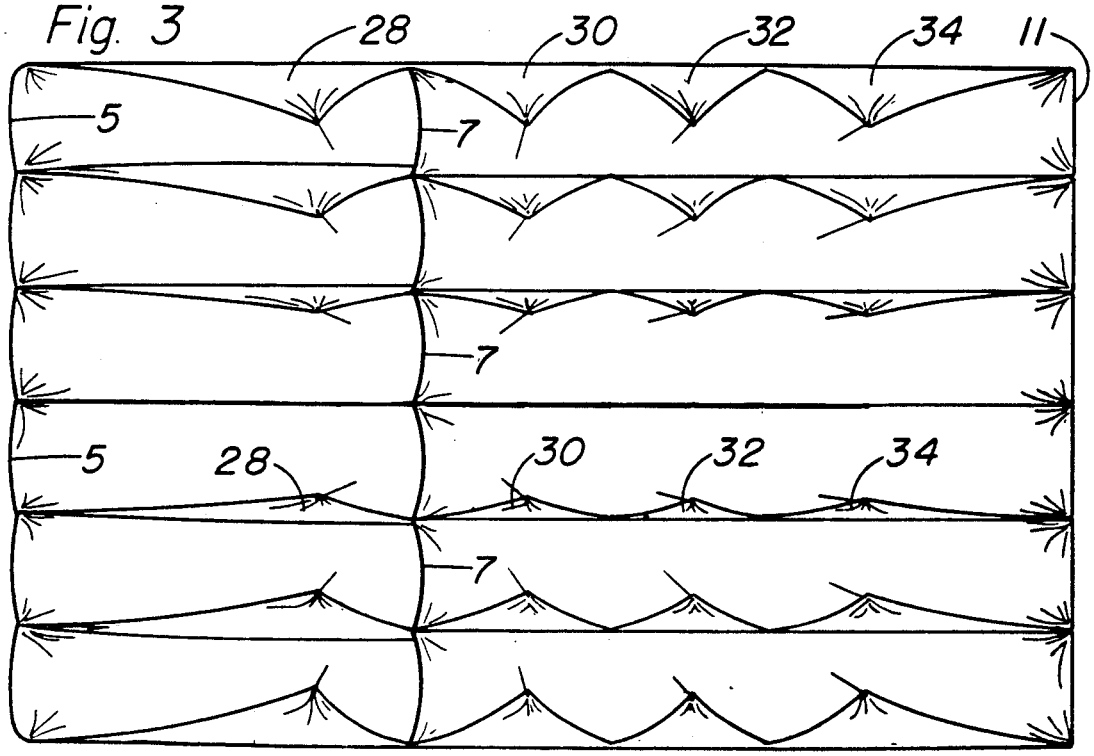
Figure 4:
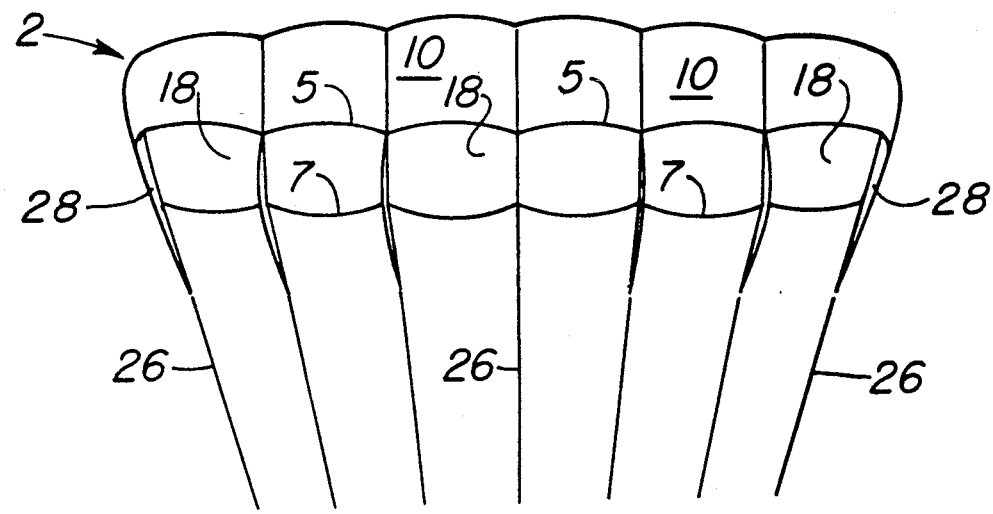
Figure 5:
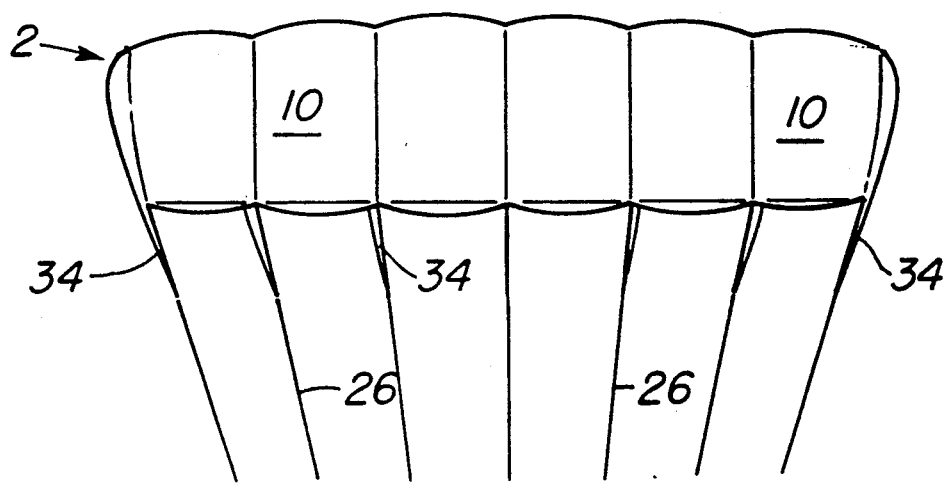
Figure 6:
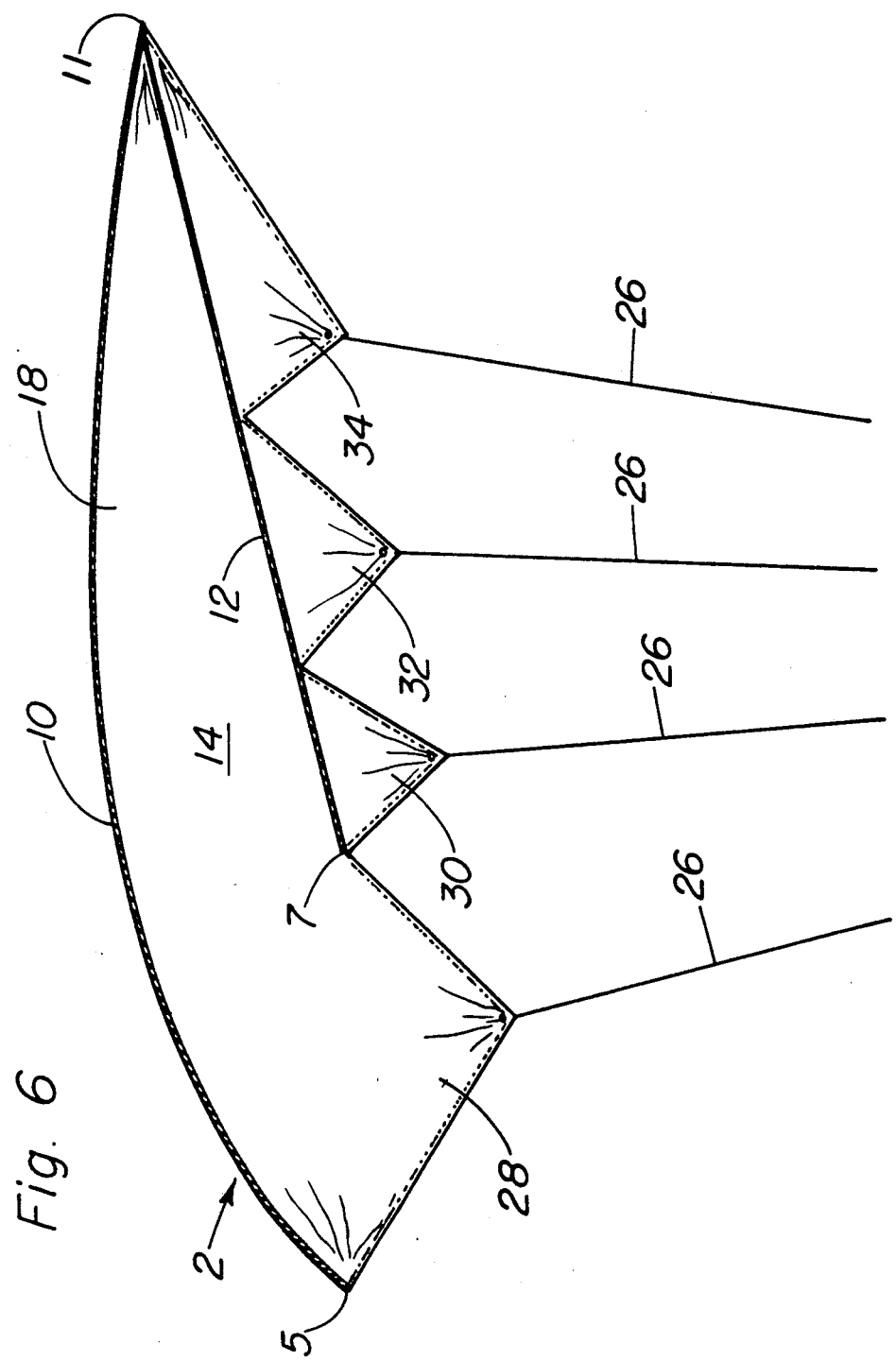
Figure 7:
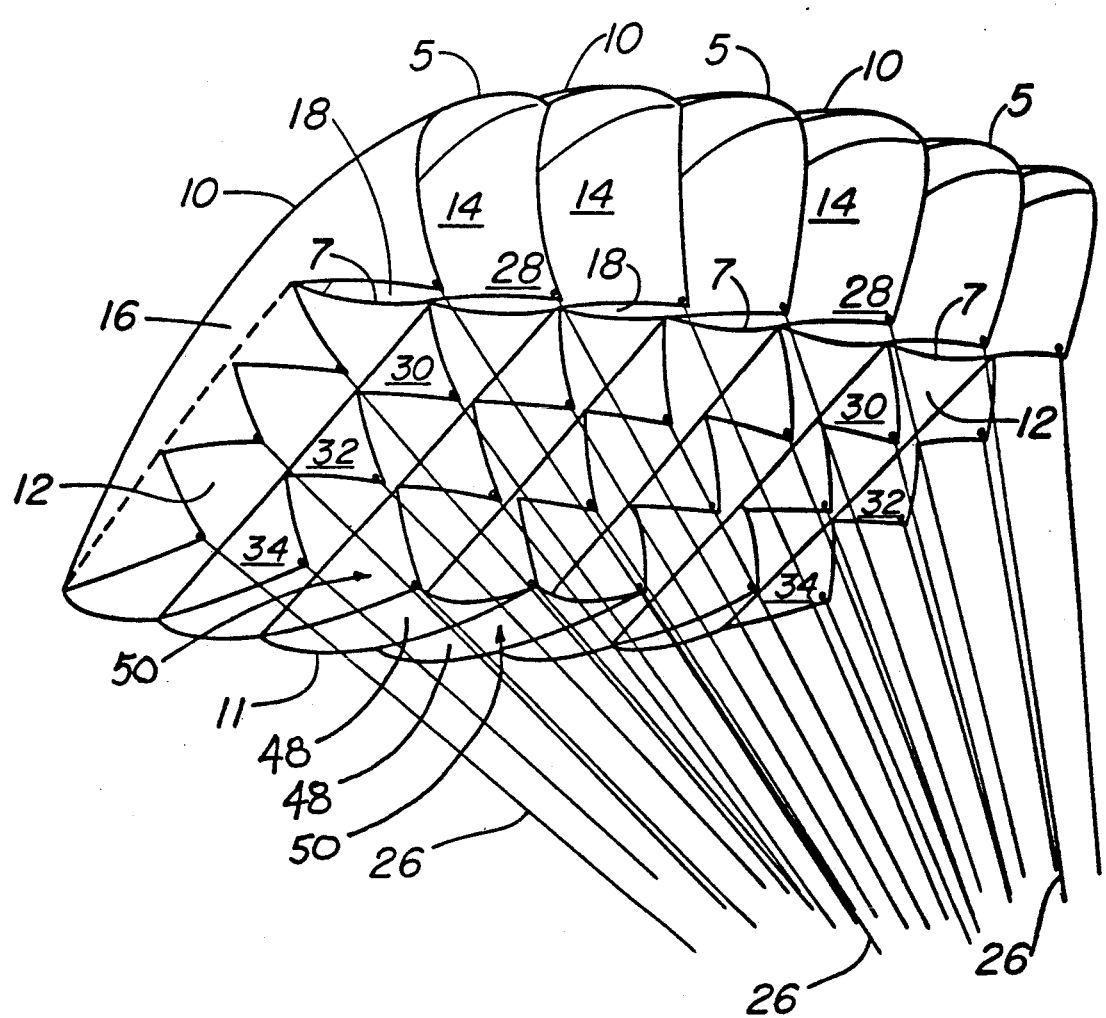
Figure 8:
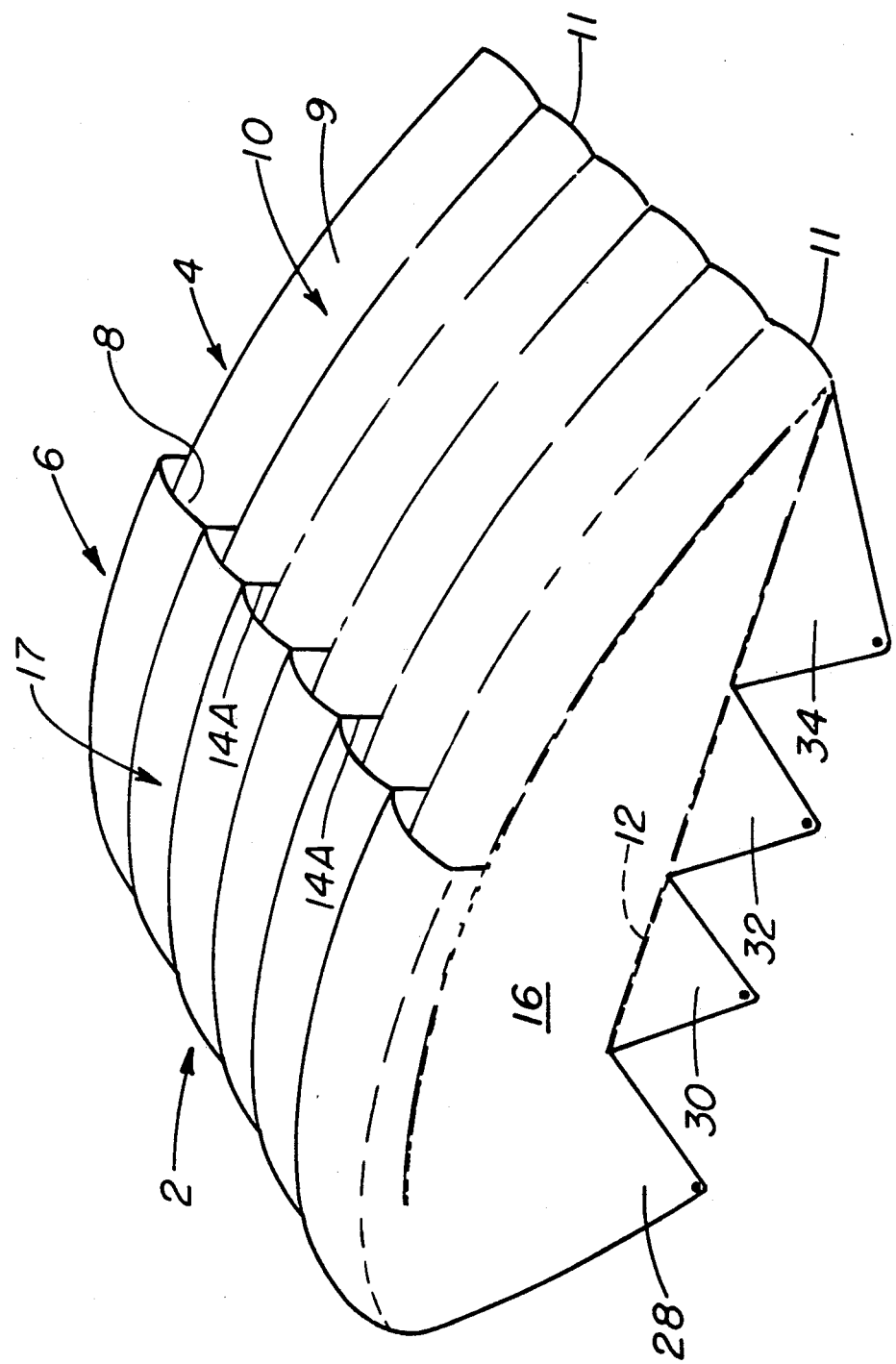
Figure 9:
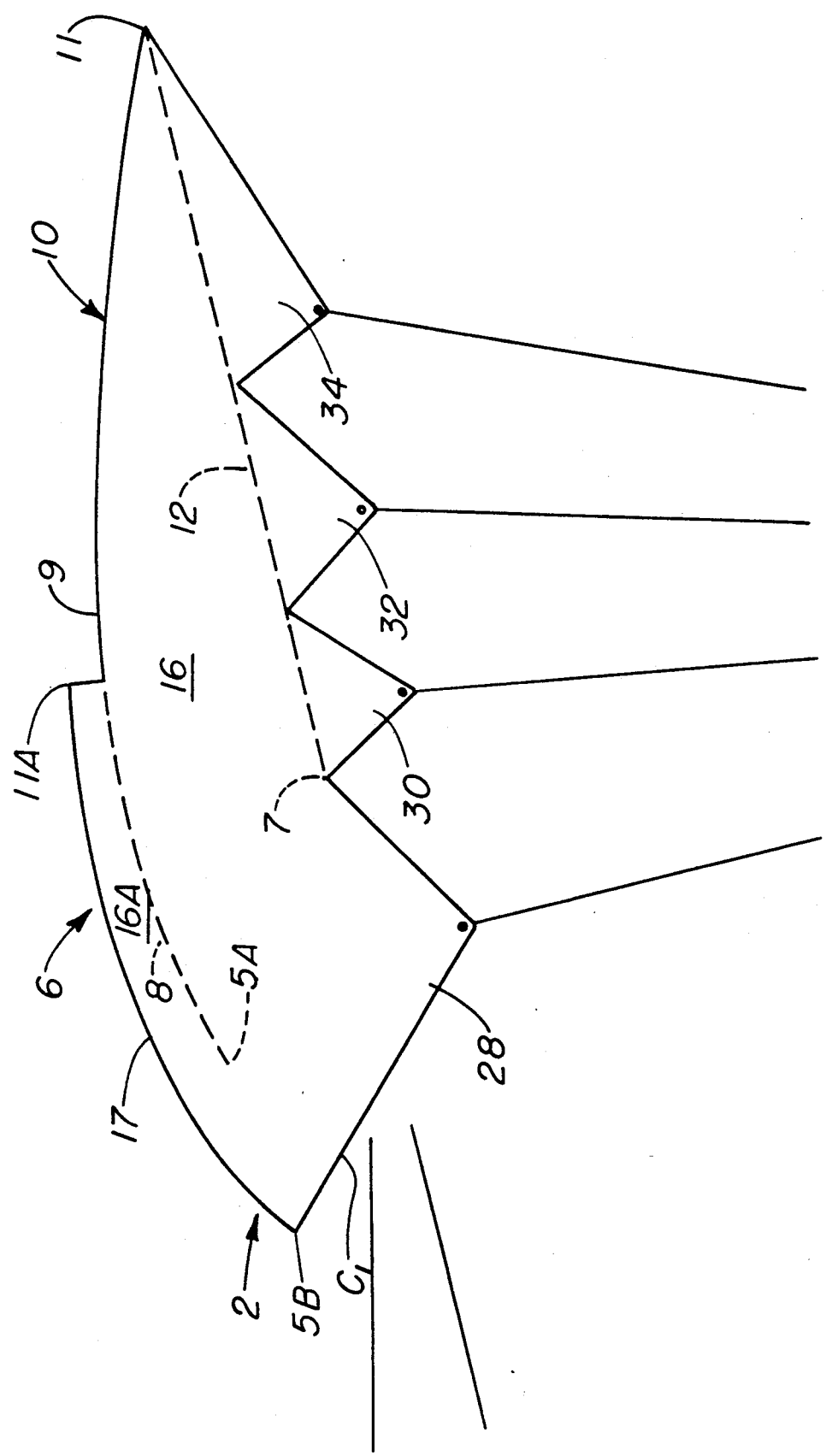
Figure 10:
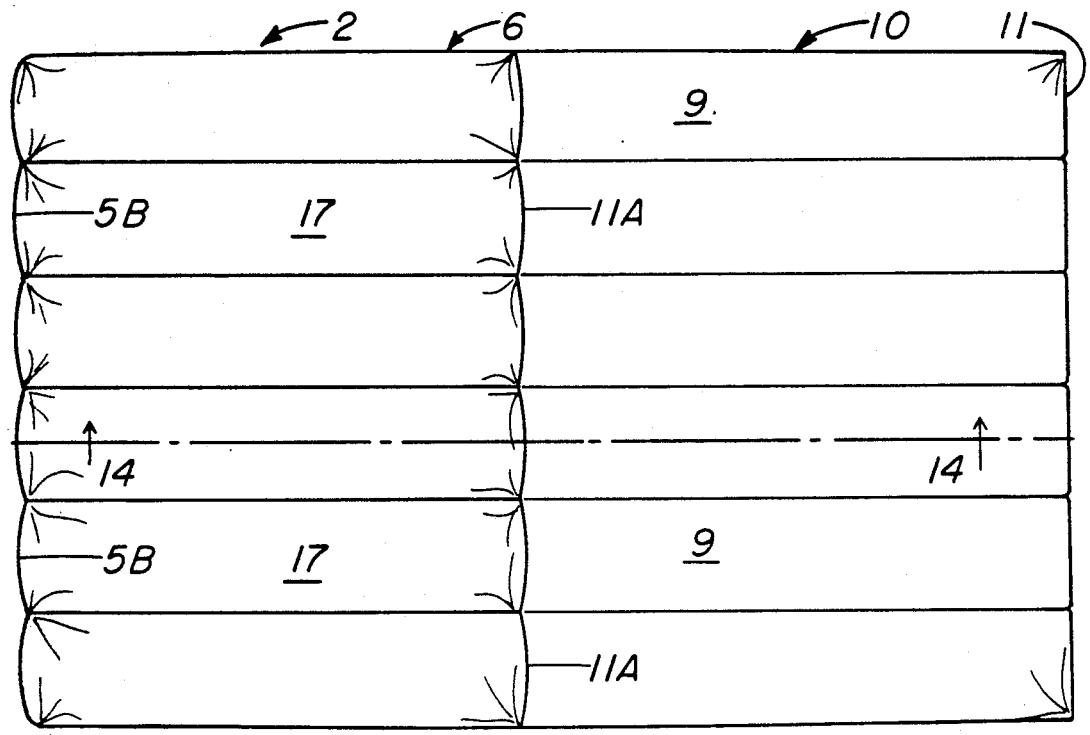
Figure 11:
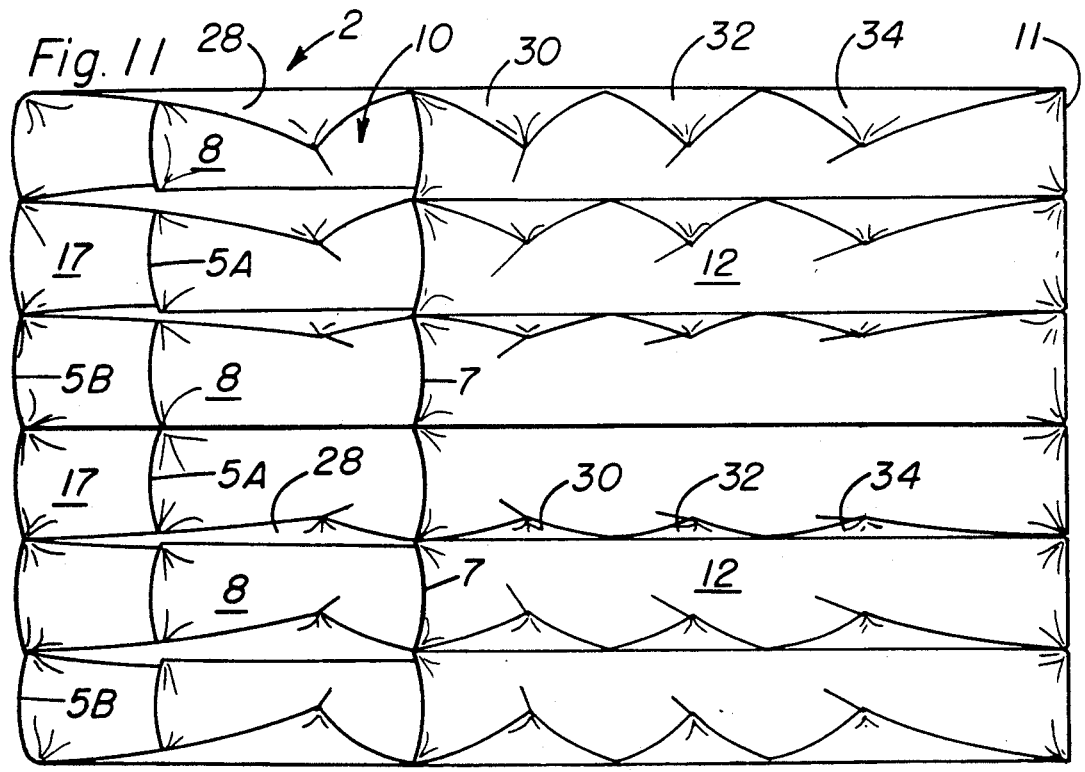
Figure 12:
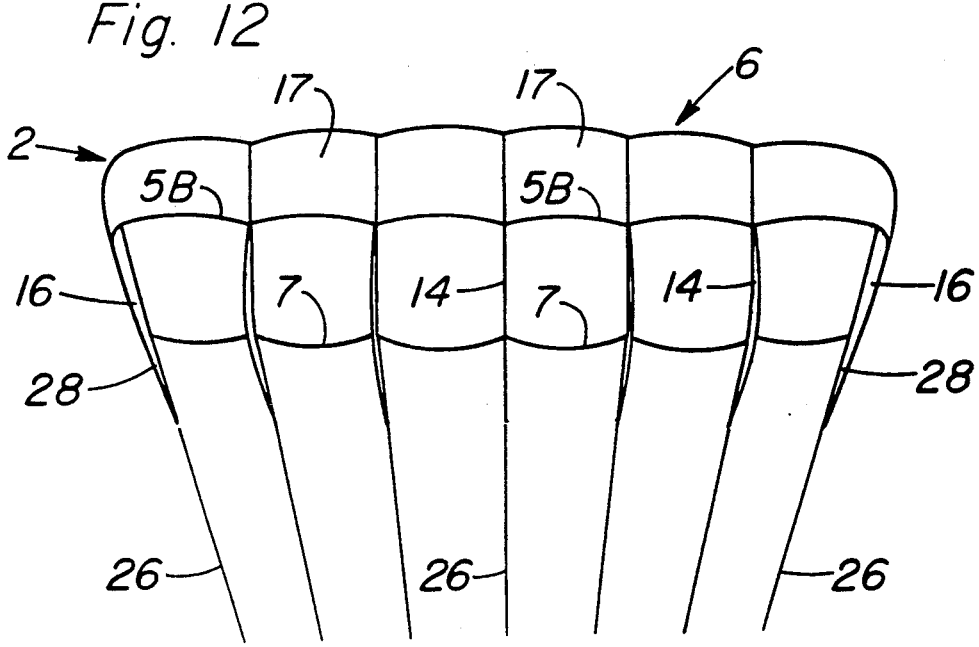
Figure 13:
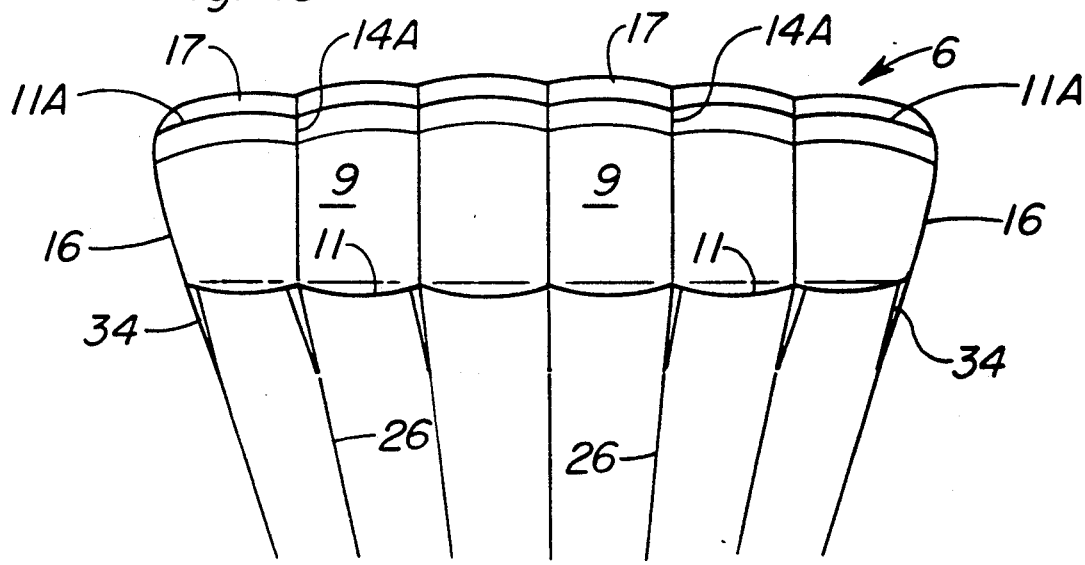
Figure 14:
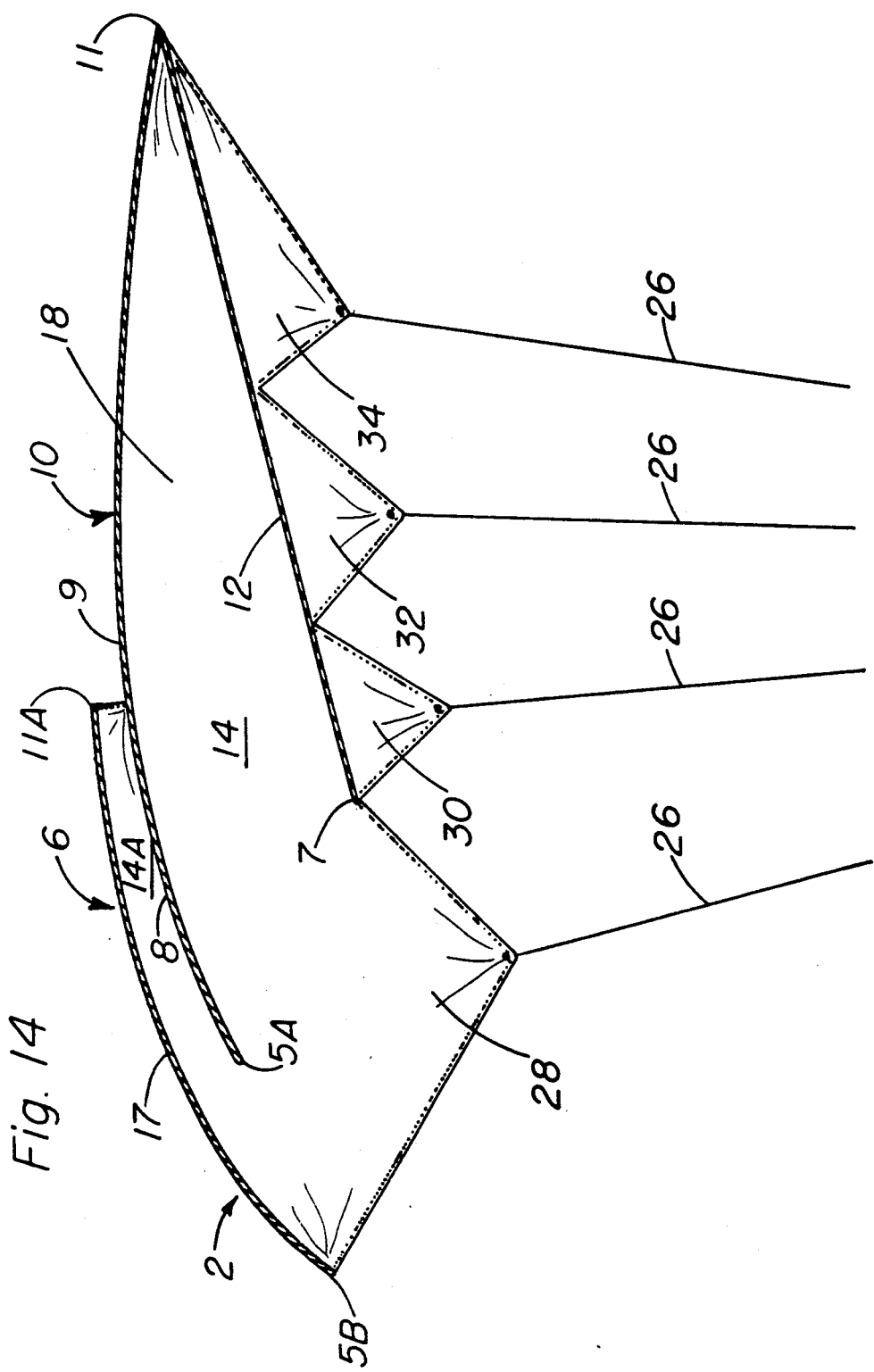
Figure 15:
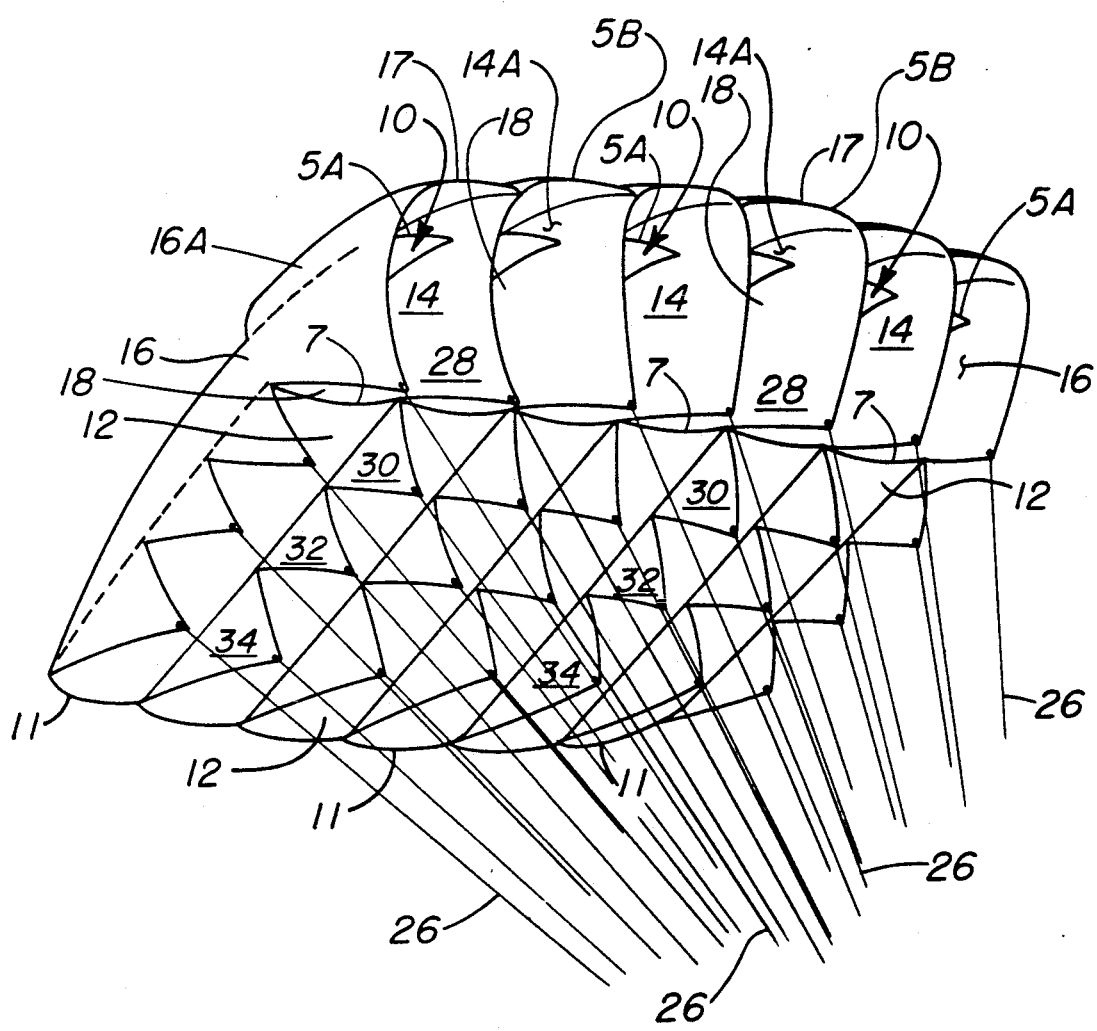

FIG .3 is a bottom view of the modification of the improved ram air, multi-cell, wing type canopy of FIG. 1 showing the entrance to the cells of the basic ram air canopy and the front line of the downwardly extending nose section;

FIG. 4 is a front view of the modification of the improved ram air, multi-cell, wing type canopy of FIG. 1 showing the forward portion of the downwardly extending nose section and the entrance to the cells of the basic ram air canopy with the support members for the shroud lines;

FIG. 5 is a rear view of the modification of the improved ram air, multi-cell, wing type canopy of FIG. 1 showing the top of the basic ram air canopy with the support members for the shroud lines;

FIG. 6 is a view taken along the line 6—6 of FIG. 2 showing the location of the forward edge of the top sheet of the basic ram air, multi-cell, wing type canopy and the forward edge of the bottom sheet of the ram air, multi-cell, wing type canopy;

FIG. 7 is a perspective view from under the right front end of the improved ram air, multi-cell, wing type canopy of FIG. 1;

FIG. 8 is a perspective view from over the left rear end of an improved ram air, multi-cell, wing type canopy showing an upper channel section; a basic ram air, multi-cell, wing type canopy; and support members for the shroud lines;

FIG. 9 is a side view of the left side of the improved ram air, multi-cell, wing type canopy of FIG. 8 showing the upper channel section; the basic ram air, multi-cell wing type canopy; and the support members for the shroud lines;

FIG. 10 is a top view of the improved ram air, multi-cell, wing type canopy of FIG. 8 showing the exit of the upper channel section and the front line of the downwardly extending nose section;

FIG. 11 is a bottom view of the improved ram air, multi-cell, wing type canopy of FIG. 8 showing the entrance to the cells of the basic ram air canopy and the entrance to the cells of the upper channel section; and the front line of the downwardly extending nose section;

FIG. 12 is a front view of the improved ram air, multi-cell, wing type canopy of FIG. 8 showing the forward portion of the downwardly extending nose section, the top of the upper channel section, and the entrance to the cells of the basic ram air canopy with the support members for the shroud lines;

FIG. 13 is a rear view of the improved ram air, multi-cell, wing type canopy of FIG. 8 showing the top of the upper channel section, the exit of the upper channel section, and the remaining top of the basic ram air canopy with the support members for the shroud lines;

FIG. 14 is a view taken along the line 14—14 of FIG. 10 showing the location of the forward edge of the top sheet of the upper channel section, the forward edge of the top sheet of the basic ram air, multi-cell, wing type canopy, and the forward edge of the bottom sheet of the ram air, multi-cell, wing type canopy; and further showing the downwardly extending nose section with an inlet guide extending downwardly from the downwardly extending nose section forward of the top and bottom sheet of the basic ram air canopy to include the front support member; and FIG. 15 is a perspective view from under the right front end of the improved ram air, multi-cell, wing type canopy of FIG. 8.

BEST MODE FOR CARRYING OUT THE INVENTION

The modified ram air, multi-cell, wing type canopy 2 shown in FIGS. 1-7, is formed from a basic ram air, multi-cell wing type canopy having an upper, or top, flexible sheet, or wall, 10, extending from a forward edge 5 to a trailing end 11, connected to a lower, or bottom, flexible sheet, or wall, 12, extending from a forward edge 7 to a trailing end 11, by a plurality of spaced flexible inner ribs 14 and end walls 16 generally having an airfoil shape.

These spacer ribs 14, and end walls 16, form cells 18 with upper and lower flexible sheets 10 and 12. The forward edges 5 and 7 of the upper flexible sheet 10 and lower flexible sheet 12, respectively, are spaced apart to provide an open air opening for inflating the cells 18 with the forward edge 7 of the lower flexible sheet 12 spaced rearwardly approximately 20% to 30% of the chord, or lower flexible sheet 12, of a prior art basic ram air, multi-cell, wing type canopy. In FIG. 1, the full lower flexible sheet 12 of a prior art basic ram air, multi-cell, wing type canopy is shown extended along a phantom line from forward edge 7 to point A. Point A is located approximately on a line C from (1) the connection of the suspension line 26 to flare 28 to (2) the forward edge 5 of the upper flexible sheet 10. The trailing edges of the upper flexible sheet 10 and lower flexible sheet 12 are shown connected to form a trailing edge 11. Controlled flow can be permitted through trailing edge 11.

It can be seen that in this modified construction (see FIG. 7) the rear portion of the ram air, multi-cell, wing type canopy, approximately 75%, is formed of cells 18 while the forward portion, approximately 25%, is formed of only the upper flexible sheet 10, spaced flexible inner ribs 14 and flexible end walls 16 and suspension means flare 28. While the suspension means is comprised of four flares 28, 30, 32 and 34, shown, a long keel member could be used, as in U.S. Pat. No. 4,930,726. A keel member is shown in phantom in FIG. 1, using the forward edge of flare 28 and rearward edge of flare 34 with the phantom line.

In this modified construction, the forward portion of the canopy has large inlet scoop-like areas formed with inlet guides to guide air against the upper flexible sheet 10 forward of forward edge 7 and into cells 18. Said inlet guides are formed from the forward portions of the flexible inner ribs 14 and flexible end walls 16, with the suspension means flare 28.

FIG. 7 shows scoops 50 formed by a sheet 48 positioned and fixed to the rearward edges of flares 34 below the middle two cells 18. These scoops receive air and prevent uncontrolled folding of the canopy downwardly and can be used when necessary. Use in tethered flight would provide greatest stabilizing effect.

The modification of the ram air, multi-cell, wing type canopy shown in FIGS. 8-15 differs from the ram air, multi-cell, wing type canopy shown in FIGS. 1-7 by the addition of an upper channel section 6 fixed to the forward portion 8 of the upper flexible sheet 10 for directing air flow over the downstream portion 9 of the upper flexible sheet 10 tapering downwardly towards rear edge 11; the upper flexible sheet 10 is shortened to a forward edge 5A; and the upper channel section 6 has an upper flexible cover sheet 17 with a front edge 5B and a rear edge 11A. Front edge 5B is located on line C1, an extension of line C in the first modification in FIG. 1.

The upper channel section 6 has its upper flexible cover sheet 17 connected to the forward portion 8 of the upper flexible sheet 10 by flexible spaced ribs 14A, fixed to and in line with ribs 14, and flexible end walls 16A, fixed to and in line with walls 16.

The channel section 6 decreases in area from its forward end at 5A to its rearward end at 11A, providing a nozzle effect, directing flow downwardly along downstream portion 9 of upper flexible sheet 10, aiding in keeping flow from separating.

Air flow can act directly on the forward end of upper sheet 17 before it is directed into the channel section 6 and acts directly on the forward portion 8 of the upper flexible sheet 10 before it pressurizes, or enters, cells 18. The air flow acts forwardly and upwardly on the forward end of sheet 17 and forward portion 8 of sheet 10. Forward edge 5B is located forward of forward edge 5A and forward edge 5A is located forward of the forward edge 7 of the lower flexible sheet 12.

While the principles of the invention have now been made clear in an illustrative embodiment, it will become obvious to those skilled in the art that many modifications in arrangement are possible without departing from those principles. The appended claims are, therefore, intended to cover and embrace any such modification, within the limits of the true spirit and scope of the invention.

It is claimed:

1. A ram air, multi-cell, wing type canopy having an upper flexible wall with a front edge and rear edge, a plurality of spaced flexible inner ribs and flexible end walls each with a front edge and rear end being connected to said upper flexible wall from its front edge to its rear edge, a lower flexible wall with a front edge and rear edge being connected to said spaced flexible inner ribs and flexible end walls, the rear edges of said upper and lower flexible walls being connected to form a canopy trailing edge, the front edge of said lower flexible wall being connected to said flexible inner ribs and flexible end walls rearwardly of the front edges of said flexible inner ribs and flexible end walls forming cells in only approximately the rear 75% of the canopy, said canopy having an inlet guide means including a portion of the flexible inner ribs and the flexible end walls along with suspension members extending from said portions of the flexible inner ribs and the flexible end walls below said lower flexible wall.

2. A ram air, multi-cell, wing type canopy having an upper flexible wall with a front edge and rear edge, a plurality of spaced flexible inner ribs and flexible end walls each with a front edge and rear end, said plurality of spaced flexible inner ribs and flexible end walls being connected to said upper flexible wall from its front edge to its rear edge, a lower flexible wall with a front edge and rear edge, the rear edges of said upper and lower flexible wall being connected to form a canopy trailing edge, said lower flexible wall being connected to said spaced flexible inner ribs and flexible end walls forming cells with said upper flexible wall, suspension means for said canopy having a forward and rearward portion, said rearward portion of said suspension means being connected to the lower flexible wall from the front edge of the lower flexible wall to the rear edge of the lower flexible wall for connecting suspension lines thereto, said lower flexible wall having its front edge spaced rearwardly from the front edge of each flexible inner rib and flexible end wall along a line extended forwardly from the front edge of said lower flexible wall, said forward portion of said suspension means forms an inlet guide means including a suspension member extending downwardly from the flexible inner ribs and flexible end walls below said lower flexible wall and forwardly of the front edge of said lower flexible wall for connecting suspension lines thereto.

3. A ram air, multi-cell, wing type canopy as set forth in claim 2 wherein the front edge of the lower flexible wall is spaced rearwardly from the front edges of the flexible inner ribs and flexible end walls approximately 20% to 30% of their length along a line where they are connected to said suspension means.

4. A ram air, multi-cell, wing type canopy as set forth in claim 2 wherein a second upper flexible wall is located over said first named upper flexible wall forming a channel thereover to direct air flow over said first named upper flexible wall.

5. A ram air, multi-cell, wing type canopy as set forth in claim 4 wherein said channel has spaced flexible inner ribs and flexible end walls.

6. A ram air, multi-cell, wing type canopy as set forth in claim 2 wherein said suspension means includes a scoop means under the lower flexible wall at the center of the rear end for preventing uncontrolled folding of the canopy downwardly.

7. A ram air, multi-cell, wing type canopy as set forth in claim 2 wherein the forward portion of the canopy has the forward portion of the suspension means connected directly to the upper flexible wall through said flexible inner ribs and flexible end walls forwardly of the front edge of said lower flexible wall, and the rearward portion of the canopy has the rearward portion of the suspension means connected directly to the lower flexible wall.

8. A ram air, multi-cell, wing type canopy as set forth in claim 2 wherein said forward portion of said suspension means forms inlet guide means with the flexible inner ribs and flexible end walls to guide air against the upper flexible wall and into said cells.

9. A ram air, multi-cell, wing type canopy as set forth in claim 2 wherein said upper flexible wall comprises two sections, a first rearward section forming the rear edge extending forwardly therefrom, and a second forward section forming the front edge extending rearwardly over said first section forming a channel section therewith, said channel section having second spaced flexible inner ribs and second flexible end walls.

10. A ram air, multi-cell wing type canopy as set forth in claim 9 wherein said second spaced flexible inner ribs are in line with said spaced flexible inner ribs below said upper flexible wall.

11. A ram air, multi-cell wing type canopy as set forth in claim 4 wherein said second upper flexible wall extends forwardly of said first named upper flexible wall.

12. A ram air, multi-cell, wing type canopy having an upper flexible wall with a front edge and rear edge, a plurality of spaced flexible inner ribs and flexible end walls each with a front edge and rear end, said plurality of spaced flexible inner ribs and flexible end walls being connected to said upper flexible wall from its front edge to its rear edge, a lower flexible wall with a front edge and rear edge, said lower flexible wall being connected to said spaced flexible inner ribs and flexible end walls forming cells with said upper flexible wall, the rear edges of said upper and lower flexible walls being connected to form a canopy trailing edge, suspension means for said canopy having a forward and rearward portion extending below said lower flexible wall, said rearward portion of said suspension means being connected to the lower flexible wall from the front end of the lower flexible wall to the rear end of the lower flexible wall, said lower flexible wall having its front edge spaced rearwardly of the front edge of the upper flexible wall, said forward portion of said suspension means being connected to said flexible inner ribs and flexible end walls forwardly of the front edge of said lower flexible wall forming an inlet guide means with a suspension member extending below said lower flexible wall.

13. A ram air, multi-cell, wing type canopy as set forth in claim 12 wherein said rearward portion of said suspension means comprises a plurality of downwardly extending support members, said forward portion of said suspension means comprising a single triangular support extending downwardly below said lower flexible wall from each flexible inner rib and flexible end wall and being located forwardly of said lower flexible wall.

14. A ram air, multi-cell, wing type canopy having an upper flexible wall with a front edge and rear edge, a lower flexible wall with a front edge and rear edge, said rear edge of said upper flexible wall and said rear edge of said lower flexible wall being connected to form a canopy trailing edge, said lower flexible wall having its front edge spaced rearwardly from the front edge of said upper flexible wall, a plurality of spaced flexible inner ribs and flexible end walls being connected to said upper flexible wall from its front edge to its rear edge and being connected to said lower flexible wall from its front edge to its rear edge forming cells, said forward part of said flexible inner ribs and flexible end walls being formed as a triangular support means extending downwardly from the front edge of said upper flexible wall and front edge of said lower flexible wall, said forward part of said flexible inner ribs and said flexible end walls along with said triangular support means forming inlet guide means, said triangular support means extending downwardly below said lower flexible wall and in front of said lower flexible wall, a plurality of support means extending downwardly from the front edge of said lower flexible wall to the rear edge of said lower flexible wall.

15. A ram air, multi-cell, wing type canopy as set forth in claim 14 wherein said cells form approximately 75% of the rear portion of the canopy, and said upper flexible wall forms approximately 25% of the forward portion of the canopy.

16. A ram air, multi-cell, wing type canopy as set forth in claim 14 wherein said triangular support means and the flexible inner ribs and flexible end walls forward of said cells form inlet guide means to guide air against the upper flexible wall forward of said cells and into said cells.

17. A ram air, multi-cell, wing type canopy as set forth in claim 14 wherein said upper flexible wall is formed having a forward section extending rearwardly from said front edge and a rearward section extending forwardly from said rear edge below said forward section forming a channel, said channel having an inlet opening rearwardly of said front edge of said forward section.

18. A ram air, multi-cell, wing type canopy as set forth in claim 16 wherein said upper flexible wall is formed having a forward section extending rearwardly from said front edge and a rearward section extending forwardly from said rear edge below said forward section forming a channel, said channel having an inlet opening rearwardly of said front edge of said forward section, said inlet opening being located directly over said triangular support means where air is guided into said inlet opening and into said cells.

19. A ram air, multi-cell, wing type canopy as set forth in claim 1 having suspension means, said suspension means having a forward portion and a rearward portion, said rearward portion of said suspension means extending downwardly from said lower flexible wall, said forward portion of said suspension means extending downwardly from said flexible inner ribs and flexible end walls forward of said cells, said forward portion of said suspension means and said flexible inner ribs and flexible end walls guide air against the upper flexible wall.

* * * * *